(12) United States Patent
Mandala et al.

(10) Patent No.: US 10,237,017 B1
(45) Date of Patent: Mar. 19, 2019

(54) POWER SAVING IN STATIONS CONNECTED TO A VERY HIGH THROUGHPUT ACCESS POINT

(71) Applicant: Uurmi Systems Pvt. Ltd., Hyderabad (IN)

(72) Inventors: Manojku Mar Mandala, Hyderabad (IN); Syama Naga Chandrasekhar Chinta, Hyderabad (IN); Vamshi Krishna Kadiyala, Hyderabad (IN)

(73) Assignee: Uurmi Systems PVT. LTD, Hyderabad (IN)

( * ) Notice: Subject to any disclaimer, the term of this patent is extended or adjusted under 35 U.S.C. 154(b) by 40 days.

(21) Appl. No.: 15/685,250

(22) Filed: Aug. 24, 2017

(51) Int. Cl.
  *H04L 1/00* (2006.01)
  *H04L 27/26* (2006.01)
  *H04L 5/00* (2006.01)
  *H04W 74/04* (2009.01)
  *H04W 74/06* (2009.01)
  *H04W 52/02* (2009.01)

(52) U.S. Cl.
  CPC .......... *H04L 1/0053* (2013.01); *H04L 1/0075* (2013.01); *H04L 5/0046* (2013.01); *H04L 27/2602* (2013.01); *H04W 74/04* (2013.01); *H04W 52/0216* (2013.01); *H04W 52/0219* (2013.01); *H04W 74/06* (2013.01)

(58) Field of Classification Search
  CPC . H04L 1/0053; H04L 5/0046; H04L 27/2602; H04L 1/0075; H04W 74/04; H04W 52/0219; H04W 52/0216; H04W 74/06
  See application file for complete search history.

(56) References Cited

U.S. PATENT DOCUMENTS

| 8,848,680 | B2 | 9/2014 | Lee et al. |
| 9,247,566 | B2* | 1/2016 | Lee .................. H04W 74/0816 |
| 2011/0103280 | A1 | 5/2011 | Liu et al. |
| 2011/0128900 | A1 | 6/2011 | Seok |

(Continued)

*Primary Examiner* — Tejis Daya
(74) *Attorney, Agent, or Firm* — Next IP Law Group (57) ABSTRACT

A system and method for power saving in power saving stations connected to a Very High Throughput (VHT) access point is disclosed. The access point receives triggers from power saving stations. The power saving stations are one of VHT Transmission Opportunity (TXOP) power saving stations and non-VHT TXOP power saving stations. Successively, Quality of service (QoS) requirements of buffered data for the power saving stations connected to the VHT access point is determined. In a first case, the QoS requirements of buffered data corresponding to the non-VHT TXOP power saving stations exceed the QoS requirements of the VHT TXOP power saving stations. During the first case, the VHT TXOP power saving stations are sent into a sleep state and buffered data corresponding to the non-VHT TXOP power saving stations is transmitted. In a second case, the QoS requirements of buffered data corresponding to the VHT TXOP power saving stations either exceeds or equal to the QoS requirement of buffered data corresponding to the non-VHT TXOP power saving stations. During the second case, the non-VHT TXOP power saving stations are sent into a sleep state and the buffered data corresponding to the VHT TXOP power saving stations is transmitted.

22 Claims, 6 Drawing Sheets

(56) References Cited

U.S. PATENT DOCUMENTS

| | | | |
|---|---|---|---|
| 2011/0141892 A1* | 6/2011 | Gong | H04W 4/08 370/235 |
| 2013/0176921 A1* | 7/2013 | Chu | H04W 52/0206 370/311 |
| 2014/0153462 A1* | 6/2014 | Matin | H04W 52/44 370/311 |
| 2014/0153463 A1* | 6/2014 | Park | H04W 52/0216 370/311 |
| 2015/0098447 A1 | 4/2015 | Kim et al. | |
| 2015/0156721 A1* | 6/2015 | Kim | H04W 52/0216 370/311 |
| 2015/0163742 A1* | 6/2015 | Kwon | H04W 52/0235 370/311 |
| 2016/0205627 A1* | 7/2016 | Zhu | H04W 52/0216 370/311 |

* cited by examiner

POWER SAVING IN STATIONS CONNECTED TO A VERY HIGH THROUGHPUT ACCESS POINT

FIELD OF THE DISCLOSURE

The presently disclosed embodiments are generally related to power saving in terminal devices in a wireless network and more particularly to power saving in terminal devices of wireless networks under Very High Throughput (VHT) access points.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

In a wireless network, a wireless device may be connected to an access point providing wireless data service. The wireless device exchanges vast information with the access point and other wireless devices connected over the wireless network. A lot of power is consumed by the wireless device during active transmission and reception of the information.

In order to make efficient utilization of power, the wireless device uses power saving techniques. Conventional power saving techniques includes legacy power save method, Unscheduled Automatic Power Save Delivery (U-APSD) method, Spatial Multiplexing power save method (SMPS), and Very High Throughput (VHT) Transmission Opportunity (TXOP) power save method.

In legacy power saving method, all the wireless devices announce their power save state by setting a power management bit. The power management bit is set in uplink frames having a positive acknowledgement. Upon receiving a frame with the power management bit being set, the access point starts buffering frames directed to the wireless device. Further, the access point announces a status of the buffered frame in Traffic Indication Map (TIM) field of a beacon frame.

Using the TIM field of the beacon frame, the wireless device discovers about buffered frames being present at the access point. Successively, the wireless device polls for the buffered frames present at the access point. The wireless device polls by transmitting PS-Poll frame when more data bit is set in received downlink Data frames or Management frames. The access point delivers the buffered frames upon receiving the PS-Poll frames from the wireless device. The wireless device can enter into a sleep state upon receiving the buffered frame with a more data field set to zero.

Also, upon receiving beacon frame with TIM element indicating absence of buffered data at the access point, the wireless device enters into the sleep mode. The wireless device remains in the sleep mode until a specified time period. After the specified time period lapses, the wireless device wakes up and operate actively to receive the beacon frames. The wireless device operates further based on data present in the beacon frames.

In one case stations may be connected to an Access Point (AP). In one exemplary case, five stations may be served by a Very High Throughput (VHT) Access point (AP). Further, the number of stations connected to the VHT Access Point may be lesser than or more than five in other implementations. The group may comprise Very High Throughput (VHT) Transmission Opportunity (TXOP) power saving stations (STA's) VHT STA1 and VHT STA2 and non-VHT UAPSD/Legacy power saving stations non-VHT STA3, non-VHT STA4, and non-VHT STA5.

Figure 1:
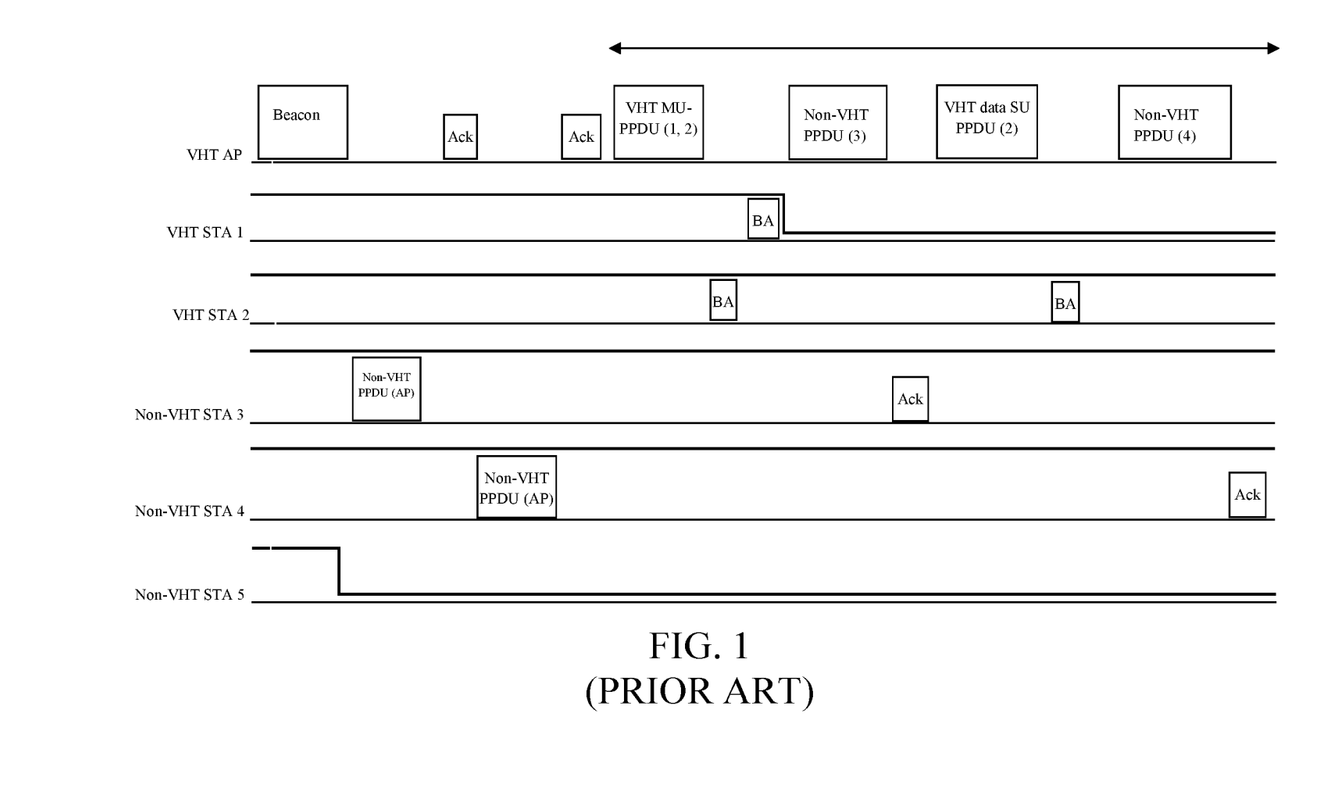
FIG. 1 illustrates a data flow sequence diagram for stations using legacy power saving method, in accordance with prior art.

In the FIG. 1, a data flow sequence diagram for stations using the legacy power saving method is illustrated. The AP transmits a beacon frame to connected stations. The beacon frame indicates presence of data at the AP, destined for different stations. Using the beacon frame, non-VHT station STA5 determines absence of any buffered frame for itself at the AP. Thus, the non-VHT station STA5 enters into a sleep state, immediately after reading the beacon frame.

Non-VHT stations STA3 and STA4 each transmits a poll/trigger and waits for receiving their buffered frames from the AP. The non-VHT stations STA3 and STA4 are later served by the AP by sending their buffered data. The buffered data sent to the non-VHT stations STA3 and STA4 are shown as non-VHT Physical Layer Protocol Data Unit (PPDU) (3) and non-VHT PPDU (4) respectively. Successively, the non-VHT stations STA3 and STA4 send to the AP, acknowledgements for received buffered data. Thus, the non-VHT stations STA3 and STA4 remain in an active state till receiving the buffered data.

The VHT stations STA1 and STA2 remain in an active state to receive their buffered data present at the AP. The VHT station STA1 receives the buffered data VHT Multi User (MU)-PPDU (1, 2) and immediately enters into sleep state after sending a Block Acknowledgement (BA). The VHT station STA2 receives the buffered data VHT MU-PPDU (1, 2) and later receives VHT SU-PPDU (2). Thus, the VHT stations STA1 and STA2 stayed in an active state. Therefore, power wastage occurs at the VHT station STA2 and the non-VHT stations STA3 and STA4 because of random transmission of data by the AP and thus continuous presence of the stations in active state.

The Unscheduled Automatic Power Save Delivery (U-APSD) power saving method operates only for delivery of downlink Quality of Service (QoS) data frames. The U-APSD power saving method does not operate on non-QoS frames and management frames. In the U-APSD power saving method, a power saving station does not poll to fetch buffered frames present at an AP. Instead, uplink QoS-data or a QoS-Null data frame acts as a trigger for delivery of downlink frames. Thus, in the U-APSD power saving method, an overhead to PS-Poll for all the buffered frames is eliminated.

Figure 2:
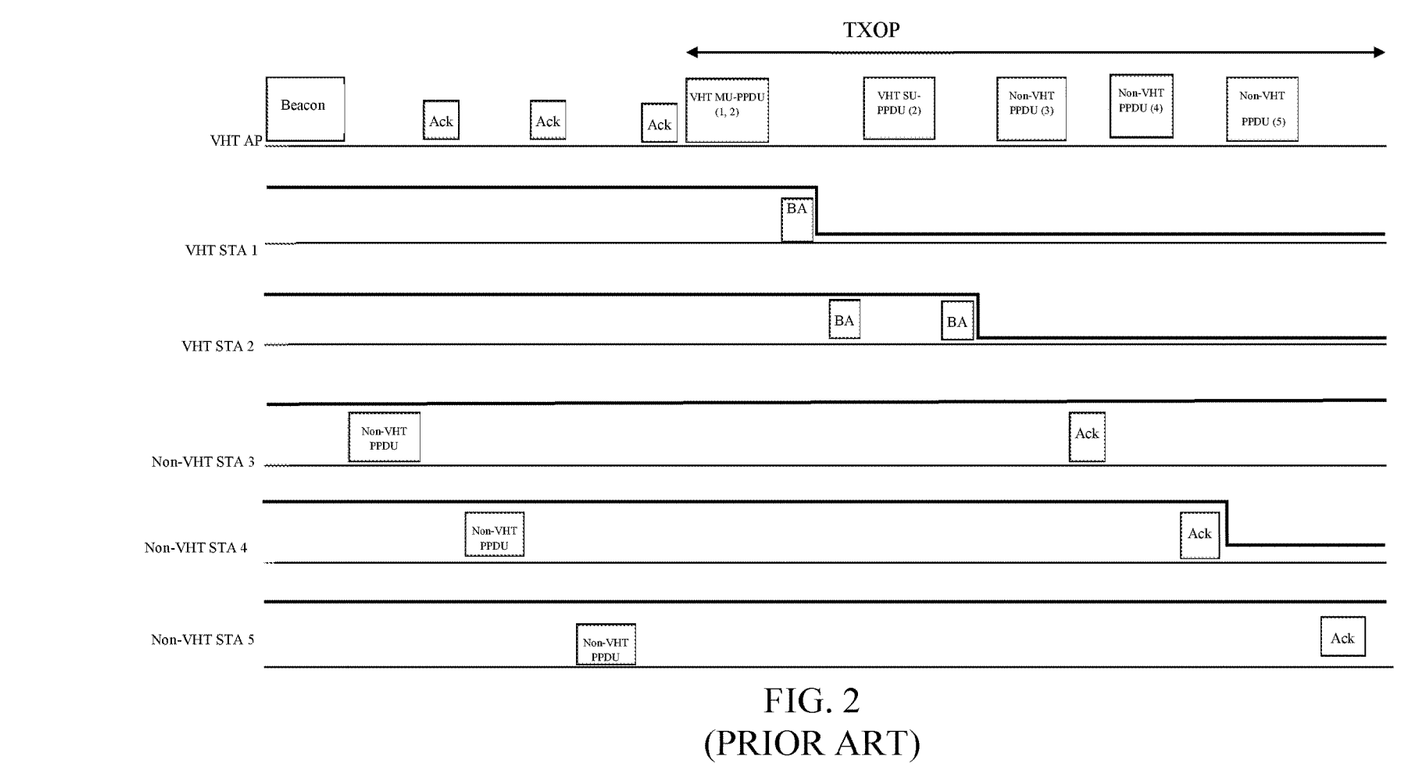
FIG. 2 illustrates a data flow sequence diagram for stations using Unscheduled Automatic Power Save Delivery (U-APSD) power saving method, in accordance with prior art.

In the FIG. 2, a data flow sequence diagram for stations using the Unscheduled Automatic Power Save Delivery (U-APSD) power saving method is illustrated. The AP transmits a beacon frame to connected stations. The beacon frame indicates presence of buffered data destined for the stations connected to the AP. Buffered data VHT MU-PPDU (1, 2) is received by VHT stations STA1 and STA2. VHT station STA2 also receives buffered data VHT SU-PPDU (2). Post receiving the buffered data, the VHT stations STA1 and STA2 may enter into a sleep state.

In one case, a partial AID associated with the VHT SU-PPDU may not match with a partial AID of the VHT station STA1. Thus, the VHT station STA1 may enter into a sleep state. In another case, a group identity (ID) associated with the VHT MU-PPDU may not match with a group ID of a group comprising the VHT stations STA1 and STA2. Thus, the VHT stations STA1 and STA2 may enter into a sleep state. In yet another case, a group ID associated with the VHT MU-PPDU may match with a group ID of the group comprising the VHT stations STA1 and STA2. Further, a Number of Spatial Streams ($N_{STS}$) corresponding to the stations STA1 and STA2 may be zero. Thus, the stations STA1 and STA2 may enter into a sleep state.

The AP has buffered data comprising non-VHT PPDU (3), non-VHT PPDU (4), and non-VHT PPDU (5) for the non-VHT stations STA3, STA4, and STA5 respectively. FIG. 2 shows that the AP served the VHT stations at first and subsequently serves the non-VHT stations. The non-VHT stations STA3, STA4, and STA5 wait constantly for receiving the buffered data present at the AP. Thus, power wastage occurs in the UAPSD power saving method, by the non-VHT stations remaining in a waiting and active state for entire TXOP period.

Very High Throughput (VHT) Transmission Opportunity (TXOP) power saving method is an IEEE 802.11ac power saving feature. All associated stations may be divided into different groups. Every group may be assigned with a unique group identity. The TXOP power saving method may use a MU-PPDU comprising a specific group ID.#

In one case, a VHT AP may announce a group ID during initialization. The group ID associated with the MU-PPDU may be matched with identities of stations connected to the AP. The stations, whose identities do not match with the group ID, may enter into a sleep state during the TXOP period.#Successively, the VHT AP may serve remaining stations whose identities match with the group ID. #

The VHT AP may allow associated VHT TXOP power saving stations to enter into a sleep state by setting a TXOP_PS_NOT_ALLOWED TX-VECTOR parameter to zero. The TXOP_PS_NOT_ALLOWED TX-VECTOR parameter may be set to zero in a VHT SU-PPDU or in a VHT MU-PPDU. But, non-VHT stations cannot change their power save state in VHT TXOP power save mode, thus wasting power. Thus, a method of saving power in non-VHT stations is much desired.

BRIEF SUMMARY

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

In an example embodiment, a method of power saving in power saving stations connected to a Very High Throughput (VHT) access point is described. The method comprises receiving triggers from power saving stations. The power saving stations may be one of VHT Transmission Opportunity (TXOP) power saving stations and non-VHT TXOP power saving stations. The method further comprises determining Quality of service (QoS) requirements of buffered data for the power saving stations connected to the VHT access point. The QoS requirements may depend primarily on a remaining lifetime of the buffered data and may depend secondarily on an amount of the buffered data and an access category of the buffered data. The access category may belong to access categories comprising voice, video, best effort, and background. The buffered data may comprise Wireless Local Area Network (WLAN) data frames and WLAN management frames. The method further comprises sending, based on the QoS requirements, at least one VHT TXOP power saving station of the VHT TXOP power saving stations into a sleep state, while the QoS requirements of buffered data corresponding to the non-VHT TXOP power saving stations either exceeds or equal to the QoS requirements of the VHT TXOP power saving stations. Further, buffered data corresponding to the non-VHT TXOP power saving stations is transmitted. The buffered data may be transmitted to the non-VHT TXOP power saving stations based on a decreasing order of the QoS requirements of buffered data corresponding to the non-VHT TXOP power saving stations. The method further comprises sending, based on the QoS requirements, at least one non-VHT TXOP power saving station of the non-VHT TXOP power saving stations into a sleep state, while the QoS requirements of buffered data corresponding to the VHT TXOP power saving stations exceed the QoS requirement of buffered data corresponding to the non-VHT TXOP power saving stations. Further, buffered data corresponding to the VHT TXOP power saving stations may be transmitted. The buffered data may be transmitted to the VHT TXOP power saving stations based on a decreasing order of the QoS requirements of buffered data corresponding to the VHT TXOP power saving stations, thereby saving power in the power saving stations connected to the VHT access point.

In an example embodiment, a Very High Throughput (VHT) access point for saving power in power saving stations connected to the VHT access point is described. The VHT access point comprises a processor to receive triggers from power saving stations. The power saving stations may be one of VHT Transmission Opportunity (TXOP) power saving stations and non-VHT TXOP power saving stations. The processor may further determine Quality of service (QoS) requirements of buffered data for the power saving stations connected to the VHT access point. The QoS requirements may depend primarily on a remaining lifetime of the buffered data and may depend secondarily on an amount of the buffered data and an access category of the buffered data. The access category may belong to access categories comprising voice, video, best effort, and background. The buffered data may comprise Wireless Local Area Network (WLAN) data frames and WLAN management frames. A frame scheduling module of the processor may send, based on the QoS requirements, send at least one VHT TXOP power saving station of the VHT TXOP power saving stations into a sleep state while the QoS requirements of buffered data corresponding to the non-VHT TXOP power saving stations either exceeds or equal to the QoS requirements of the VHT TXOP power saving stations. Further, buffered data corresponding to the non-VHT TXOP power saving stations may be transmitted. The buffered data may be transmitted to the non-VHT TXOP power saving stations based on a decreasing order of the QoS requirements of buffered data corresponding to the non-VHT TXOP power saving stations. The processor may further send at least one non-VHT TXOP power saving station of the non-VHT TXOP power saving stations into a sleep state while the QoS requirements of buffered data corresponding to the VHT TXOP power saving stations exceed the QoS requirement of buffered data corresponding to the non-VHT TXOP power saving stations. Further, buffered data corresponding to the VHT TXOP power saving stations may be transmitted. The buffered data may be transmitted to the VHT TXOP power saving stations based on a decreasing order of the QoS requirements of buffered data corresponding to the VHT TXOP power saving stations, thereby saving power in the power saving stations connected to the VHT access point.

In an example embodiment, a non-transitory computer readable medium embodying a program executable in a computing device for power saving in power saving stations connected to a Very High Throughput (VHT) access point is described. The program may comprise a program code for receiving triggers from power saving stations. The power saving stations may be one of VHT Transmission Opportunity (TXOP) power saving stations and non-VHT TXOP power saving stations. The program may further comprise a program code for determining Quality of service (QoS) requirements of buffered data for the power saving stations connected to the VHT access point. The QoS requirements may depend primarily on a remaining lifetime of the buffered data and may depend secondarily on an amount of the buffered data and an access category of the buffered data. The access category may belong to access categories comprising voice, video, best effort, and background. The buffered data may comprise Wireless Local Area Network (WLAN) data frames and WLAN management frames. The program may further comprise a program code for sending, at least one VHT TXOP power saving station of the VHT TXOP power saving stations into a sleep state while the QoS requirements of buffered data corresponding to the non-VHT TXOP power saving stations either exceeds or equal to the QoS requirements of the VHT TXOP power saving stations. Further, buffered data corresponding to the non-VHT TXOP power saving stations may be transmitted. The buffered data may be transmitted to the non-VHT TXOP power saving stations based on a decreasing order of the QoS requirements of buffered data corresponding to the non-VHT TXOP power saving stations. The program may further comprise a program code for sending, at least one non-VHT TXOP power saving station of the non-VHT TXOP power saving stations into a sleep state while the QoS requirements of buffered data corresponding to the VHT TXOP power saving stations exceed the QoS requirement of buffered data corresponding to the non-VHT TXOP power saving stations. Further, buffered data corresponding to the VHT TXOP power saving stations may be transmitted. The buffered data may be transmitted to the VHT TXOP power saving stations based on a decreasing order of the QoS requirements of buffered data corresponding to the VHT TXOP power saving stations, thereby saving power in the power saving stations connected to the VHT access point.

BRIEF DESCRIPTION OF THE DRAWINGS

The accompanying drawings illustrate various embodiments of systems, devices, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Unless specifically stated otherwise, as apparent from the following discussion, it is appreciated that throughout this specification discussions utilizing terms such as "processing," "performing," "partitioning," "determining," or the like refer to the actions or processes that may be performed by a computing platform, such as a computer or a similar electronic computing device, that is operable to manipulate or transform data represented as physical, electronic or magnetic quantities or other physical quantities within the computing platform's processors, memories, registers, or other information storage, transmission, reception or display devices. Accordingly, a computing platform refers to a system or a device that includes the ability to process or store data in the form of signals. Thus, a computing platform, in this context, may comprise hardware, software, firmware or any combination thereof. Further, unless specifically stated otherwise, a process as described herein, with reference to flowcharts or otherwise, may also be executed or controlled, in whole or in part, by a computing platform.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

It is an object of the current disclosure to provide a system, method and device that enables power saving in power saving stations connected to a Very High Throughput (VHT) access point.

It must also be noted that as used herein and in the appended claims, term such as PPDU refer to contents of both MPDU and PPDU.

Figure 3:
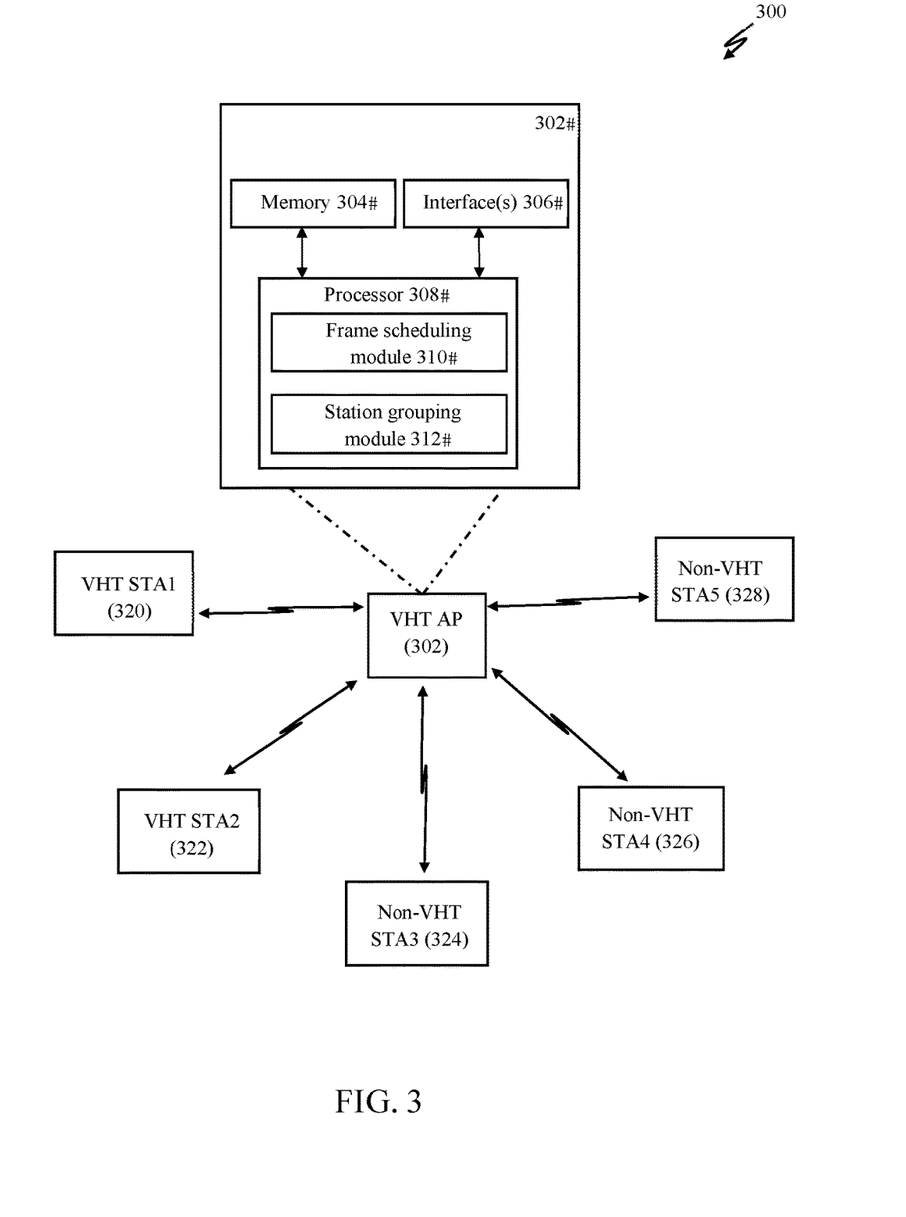
FIG. 3 illustrates a network connection diagram 300 of power saving stations connected to a Very High Throughput (VHT) Access Point, in accordance with an embodiment of present disclosure.

FIG. 3 illustrates a network connection diagram 300 of power saving stations connected to a Very High Throughput (VHT) Access Point (AP) 302, in accordance with an embodiment of present disclosure. The VHT access point 302 may be connected to the power saving stations 320-328 through a communication network. The network connecting the VHT access point 302 and the power saving stations 320-328 may be essentially implemented using IEEE 802.11 standard. Further, the communication network may use other communication techniques for achieving connectivity between different units or modules. The other communication techniques may be selected from Visible Light Communication (VLC), Worldwide Interoperability for Microwave Access (WiMAX), Long term evolution (LTE),), Infrared (IR) communication, Public Switched Telephone Network (PSTN), and Radio waves.

The VHT access point 302 comprises a processor 308. The processor 308 may execute computer program instructions stored in a memory 304. The processor 308 may also be configured to decode and execute any instructions received from one or more other electronic devices or one or more remote servers. The processor 308 may include one or more general purpose processors (e.g., INTEL microprocessors) and/or one or more special purpose processors (e.g., digital signal processors or Xilinx System On Chip (SOC) Field Programmable Gate Array (FPGA) processor). The processor 308 may be configured to execute one or more computer-readable program instructions, such as program instructions to carry out any of the functions described in this description.

The memory 304 may include a computer readable medium. A computer readable medium may include volatile and/or non-volatile storage components, such as optical, magnetic, organic or other memory or disc storage, which may be integrated in whole or in part with a processor, such as processor 308. Alternatively, the entire computer readable medium may be remote from processor 308 and coupled to processor 308 by connection mechanism and/or network cable. In addition to memory 304, there may be additional memories that may be coupled with the processor 308.

Interface(s) 306 may be used to interact with or program the VHT access point 302 to achieve desired functionality. The interface(s) 306 may either be Command Line Interface (CLI) or Graphical User Interface (GUI).

In one embodiment, a VHT access point 302 may wait after a beacon is sent by the VHT access point 302. The VHT access point 302 may wait either to receive trigger from a power saving station or to complete ongoing transmission of data associated to a non-power saving station. Subsequently, the VHT access point 302 may receive a trigger from at least one of the power saving stations. The power saving stations may be one of Very High Throughput (VHT) Transmission Opportunity (TXOP) power saving stations and non-VHT TXOP power saving stations. The trigger may be received for requesting downlink delivery of the buffered data. The trigger may be at least one of a Power Save (PS)-Poll, Quality of Service (QoS) data, and QoS Null data.

Post receiving the trigger, the VHT access point 302 may determine Quality of service (QoS) requirements of buffered data for the power saving stations connected to the VHT access point 302. The QoS requirements may primarily depend on a remaining lifetime of the buffered data. The QoS requirements may secondarily depend on an amount of the buffered data and an access category of the buffered data. The access category may belong to access categories comprising voice, video, best effort, and background. A priority order of the access categories may be voice-video-best effort-background. In the mentioned priority order, voice has a highest priority and the background has a least priority. The buffered data may comprise Wireless Local Area Network (WLAN) data frames and WLAN management frames.

In one embodiment, the QoS requirements of one or more VHT TXOP power saving stations may be equal to the QoS requirement of non-VHT power saving station. During such condition, a higher priority may be provided to the non-VHT TXOP power saving stations than the VHT TXOP power saving stations.

In another embodiment, the QoS requirements of buffered data corresponding to at least one of the non-VHT TXOP power saving stations may exceed the QoS requirements of the VHT TXOP power saving stations. During such a condition, a frame scheduling module 310 of the VHT access point 302 may send at least one of the VHT TXOP power saving stations into a sleep state. Post sending at least one of the VHT TXOP power saving stations into a sleep state, the frame scheduling module 310 may transmit buffered data corresponding to the non-VHT TXOP power saving stations. In one case, the buffered data may be transmitted to the non-VHT TXOP power saving stations based on the QoS requirements of buffered data corresponding to the non-VHT TXOP power saving stations. Further, the transmission may occur based on a decreasing order of the QoS requirements of the buffered data.

In one embodiment, at least one VHT TXOP power saving station may be sent into the sleep state by transmitting a VHT Physical layer Protocol Data Unit (PPDU) to the at least one VHT TXOP power saving station. In one case, the VHT PPDU may be a VHT SU-PPDU. The VHT SU-PPDU may comprise a more data bit field set as zero.

In another embodiment, at least one of the VHT TXOP power saving station may be sent into the sleep state by sending a VHT SU-PPDU with QoS-Null data frame. During such transmission, a more data bit field of the VHT SU-PPDU may be set as zero. Further, during such transmission, a no-acknowledgement (no-ACK) policy may be used. Further, a PARTIAL_AID of the VHT SU-PPDU may be set similar to the PARTIAL_AID of the at least one VHT TXOP power saving station.

In an embodiment, the at least one VHT TXOP power saving station may be sent into a sleep state by sending a VHT MU-PPDU to a group comprising the at least one VHT TXOP power saving station. The at least one VHT TXOP power saving station and other stations using power saving techniques different from VHT TXOP power saving may be grouped into a group. The at least one VHT TXOP power saving station and other stations may be grouped into a single group while QoS requirements of the other stations are more compared to remaining VHT TXOP power saving stations.

The VHT MU-PPDU may comprise frames having a more data bit field set as zero. Further, the VHT MU-PPDU may be sent with a QoS-Null data frame. The QoS-Null data frame may comprise a more data bit field set as zero. During such transmission, a no-acknowledgement (no-ACK) policy may be used. Further, a Group ID (GID) belonging to the MU-PPDU may be set similar to a GID of a group comprising the at least one VHT TXOP power saving station. Further, a Number of Spatial Streams ($N_{STS}$) of VHT TXOP power saving stations present in a group other than the at least one VHT TXOP power saving station may be set as zero.

In one embodiment, the VHT TXOP power saving stations may be sent into the sleep state by transmitting a VHT MU-PPDU with QoS Null data and a GROUP ID not matching with any group in a BSS.

In one embodiment, the VHT access point 302 may determine a time required to serve the buffered data to the at least one non-VHT TXOP power saving station and the VHT TXOP power saving stations. The time required to serve the buffered data may be determined based on fall-back rates for retransmissions and required protection mechanisms.

In a second embodiment, the QoS requirements of buffered data corresponding to at least one of the VHT TXOP power saving stations may exceed the QoS requirements of the non-VHT TXOP power saving stations. During such a condition, the frame scheduling module 310 of the VHT access point 302 may send at least one of the non-VHT TXOP power saving stations into a sleep state.

In one embodiment, a listen interval of at least one of the non-VHT TXOP power saving stations may be less than a Delivery Traffic Indication Map (DTIM) interval of a Basic Service Set (BSS). Further, a remaining lifetime of buffered frames associated to at least one of the non-VHT TXOP power saving station may be more than two times the listen interval. During said condition, at least one of the non-VHT TXOP power saving station may be sent into a sleep state, till end of a listen interval. The non-VHT TXOP power saving station may be sent into a sleep state by avoiding announcement of the buffered data in Traffic Indication Map (TIM) element.

In one embodiment, a remaining lifetime of buffered frames for at least one of the non-VHT TXOP power saving station may be more than two times the DTIM interval of the BSS. Such condition occurs when DTIM interval of the BSS is smaller than a listen interval of a station. During such condition, at least one of the non-VHT TXOP power saving station may be sent into the sleep state till end of a next Delivery Traffic Indication Map (DTIM) interval of the Basic Service Set (BSS). The non-VHT TXOP power saving station may be sent into the sleep state by avoiding announcement of the buffered data in Traffic Indication Map (TIM) element.

In one embodiment, while at least one of the non-VHT TXOP power saving stations is sent into a sleep state, the frame scheduling module 310 may transmit buffered data corresponding to the VHT TXOP power saving stations. In one case, the buffered data may be transmitted to the VHT TXOP power saving stations based on the QoS requirements of buffered data corresponding to the VHT TXOP power saving stations. The transmission of buffered data may occur based on a decreasing order of the QoS requirements.

In one embodiment, the VHT access point 302 may receive triggers from multiple VHT TXOP power saving stations belonging to a same group. During such condition, the VHT access point may transmit the buffered data corresponding to multiple VHT TXOP power saving stations using a MU-PPDU. In one case, triggers may be received from VHT TXOP power saving stations present in different groups. During such case, a group having VHT TXOP power saving stations with higher QoS requirements may be served at first.

First Exemplary Embodiment

Figure 4:
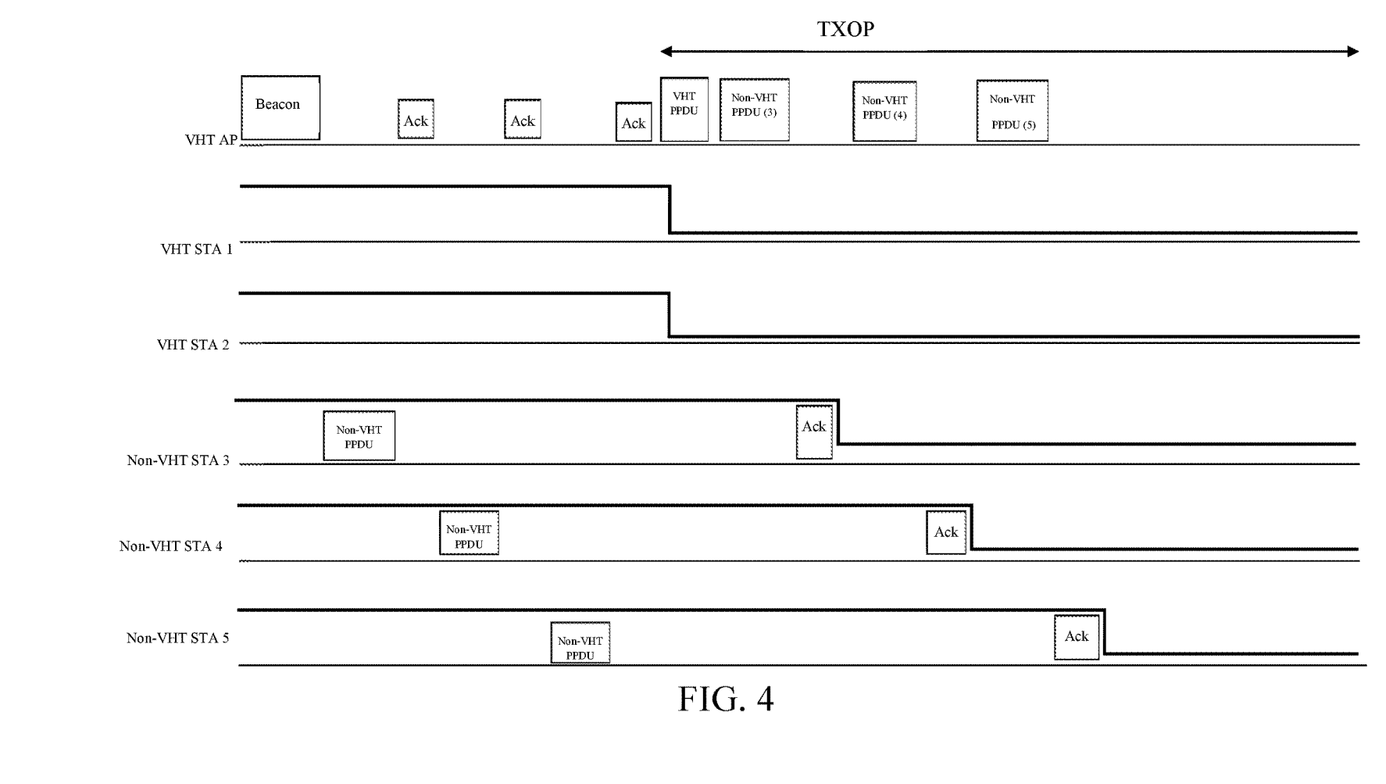
FIG. 4 illustrates a data flow sequence diagram for stations using Very High Throughput (VHT)-Transmission Opportunity (TXOP) power saving method, according to an example embodiment.

In one embodiment, a Very High Throughput (VHT)-Transmission Opportunity (TXOP) power saving method is explained referring to a data flow sequence diagram for power saving stations using VHT-TXOP power saving method illustrated in FIG. 4. As illustrated, the VHT access point 302 communicates with power saving stations 320-328. The power saving stations comprise VHT-TXOP power saving stations STA1 320 and STA2 322 and non-VHT TXOP power saving stations STA3 324, STA4 326, and STA5 328.

In one embodiment, the VHT access point 302 may transmit a beacon to the power saving stations connected to the VHT access point 302. The TIM field of the beacon may indicate any power saving station to remain in an active state or enter into a sleep state. The power saving stations may contend to gain access to the channel for transmission and reception of buffered data, during the new beacon period. The buffered data may comprise Wireless Local Area Network (WLAN) data frames and WLAN management frames. The VHT access point 302 may wait for some time after sending the beacon. The VHT access point 302 may wait either to receive triggers from the power saving stations or to complete ongoing transmission of data associated to a non-power saving station.

In one embodiment, the VHT access point 302 may wait when a remaining lifetime of buffered data for a VHT power saving station transmitting a trigger is of at least 10% value. A factor of 10% is chosen based on test results where an optimum power saving was achieved without affecting the data communication efficiency of the access point and the power saving stations. In another case, the remaining lifetime of the buffered data may be set to another value greater or lesser than the 10% value, to obtain better power saving results with optimum data communication efficiency.

In another embodiment, the VHT access point 302 may wait when a next Target Beacon Transmission Time (TBTT) is at least one Time Unit (TU) higher than 5% of a beacon interval. A factor of 5% is chosen based on test results where an optimum power saving was achieved without affecting the data communication efficiency of the access point and the power saving stations. In another case, the TBTT value may be set to another value greater or lesser than 5% of the beacon interval to obtain better power saving results with optimum data communication efficiency.

Post waiting, the VHT access point 302 may receive triggers from the power saving stations. Successive to receiving the triggers, the VHT access point 302 may determine Quality of service (QoS) requirements of buffered data for the VHT-TXOP power saving stations STA1 320 and STA2 322 and non-VHT TXOP power saving stations STA3 324, STA4 326, and STA5 328.

In one embodiment, the QoS requirements may depend primarily on a remaining lifetime of the buffered data. The QoS requirements may depend secondarily on an amount of the buffered data and an access category of the buffered data. The access category may belong to access categories comprising voice, video, best effort, and background. In one case, a priority order of the access categories may be voice-video-best effort-background. The voice may have a highest priority and the background may have a least priority in the priority order.

In one embodiment, the VHT access point 302 may determine the QoS requirements of buffered data corresponding to the non-VHT TXOP power saving stations 324-328 to be more than the QoS requirements of the VHT TXOP power saving stations 320-322. Post determining the QoS requirements for the non-VHT TXOP power saving stations 324-328 to be more, the VHT access point 302 may send at least one of the VHT TXOP power saving stations 320-322 into a sleep state, for entire TXOP duration. In one case, the VHT access point 302 may send both the VHT TXOP power saving stations STA1 320 and STA2 322 into a sleep state. Successively, the VHT access point 302 may transmit buffered data corresponding to the non-VHT TXOP power saving stations STA3 324, STA4 326, and STA5 328.

In one embodiment, the VHT access point 302 may send the VHT TXOP power saving stations STA1 320 and STA2 322 into the sleep state by transmitting a VHT Physical layer Protocol Data Unit (PPDU). In one case, the VHT PPDU transmitted to the VHT TXOP power saving stations STA1 320 and STA2 322 may be a VHT SU-PPDU. A more data bit field of the VHT SU-PPDU may be set as zero.

In another embodiment, the VHT access point 302 may transmit VHT SU-PPDU's with QoS-Null data frame to each of the VHT TXOP power saving stations STA1 320 or STA2 322. Upon receiving the VHT SU-PPDU's with QoS-Null data frame, the VHT TXOP power saving stations STA1 320 and STA2 322 may enter into the sleep state. A more data bit field of the VHT SU-PPDU may be set as zero. Further, a no-acknowledgement (no-ACK) policy may be used while transmitting the VHT SU-PPDU's with QoS-Null data frame. In one case, a PARTIAL_AID associated with the VHT SU-PPDU may be set similar to PARTIAL_AID of the VHT TXOP power saving stations STA1 320 or STA2 322.

In an embodiment, the VHT access point 302 may send VHT TXOP power saving stations 320-322, present in a group, into a sleep state by transmitting a VHT MU-PPDU to the group. In one case, the VHT access point 302 may send the VHT TXOP power saving stations STA1 320 and STA2 322 into a sleep state by transmitting a VHT MU-PPDU to the group comprising STA1 320 and STA2 322. A more data bit field of the VHT MU-PPDU may be set as zero.

VHT TXOP power saving stations STA1 320 and STA2 322 may be present in a group. A station grouping module 312 may regroup or create new groups amongst the power saving stations. In one case, the VHT TXOP power saving stations may be grouped based on at least one of availability of the buffered data, channel estimation results, traffic patterns of the power saving stations, and locations of the power saving stations. A group membership status may be announced in a management frame by setting a buffered group addressed frames field in TIM element.

In one embodiment, the station grouping module 312 may group a VHT TXOP power saving station and other stations using power saving techniques different from VHT TXOP power saving, into a single group. The VHT TXOP power saving station and other stations may be grouped while QoS requirements of the other stations are more compared to remaining VHT TXOP power saving stations.

In one embodiment, the VHT access point 302 may do not have any buffered data corresponding to the VHT TXOP power saving stations STA1 320 and STA2 322. During such condition, the VHT MU-PPDU may be sent with a QoS-Null data frame. The QoS-Null data frame may comprise a more data bit field set as zero. Further, during the transmission, a no-acknowledgement (no-ACK) policy may be used. In another case, a Group ID (GID) associated with the VHT MU-PPDU may be set as a GID belonging to a group comprising the VHT TXOP power saving stations STA1 320 and STA2 322. Further, a Number of Spatial Streams ($N_{STS}$) of the VHT TXOP power saving stations present in a group (STA1 320 and STA2 322) may be set as zero, to enter the STA1 320 and STA2 322 into sleep state.

In an embodiment, the VHT TXOP power saving stations STA1 320 and STA2 322 may be sent into the sleep state by transmitting a VHT MU-PPDU with QoS Null data and a GROUP ID not matching with any group in a BSS.

Subsequent to sending the VHT power saving stations STA1 320 and STA2 322 into sleep state, the VHT access point 302 may transmit the buffered data corresponding to the non-VHT power saving stations STA3 324, STA4 326, and STA5 328. In one case, the buffered data may be transmitted based on an order of the QoS requirements of buffered data corresponding to the non-VHT TXOP power saving stations STA3 324, STA4 326, and STA5 328.

An order of QoS requirements may depend primarily on a remaining lifetime of the buffered data. The order of QoS requirements may depend secondarily on an amount of the buffered data and an access category of the buffered data. The access category may be at least one of voice, video, best effort, and background. In one case, a priority order of the access categories may be voice-video-best effort-background. The voice may have a highest priority and the background may have a least priority in the priority order.

Referring to the FIG. 4, an exemplary transmission scheme of the buffered data to the non-VHT power saving stations STA3 324, STA4 326, and STA5 328 is described. In one case, the transmission may correspond to the access category of voice for the TXOP period. In one case, the VHT access point 302 may have 3 voice frames for the non-VHT power saving station STA3 324. The VHT access point 302 may have 2 video frames and 1 voice frame for the non-VHT power saving station STA4 326. Further, the VHT access point 302 may have 1 background frame and 1 voice frame for the non-VHT power saving station STA5 328. In current scenario, the VHT access point 302 may transmit the buffered data to the non-VHT power saving station STA3 324 at first, then to STA4 326, and lastly to STA5 328.

In one embodiment, the VHT access point 302 may determine a time required to serve the buffered data to the non-VHT TXOP power saving stations STA3 324, STA4 326, and STA5 328 and the VHT TXOP power saving stations STA1 320 and STA2 322. The time required to serve the buffered data may be determined based on fall-back rates for retransmissions and required protection mechanisms.

As explained above using the first exemplary embodiment, sending the VHT power saving stations into the sleep state while transmitting the buffered data to the non-VHT power saving stations avoids significant waiting by the VHT power saving stations. Thus, the above described method helps in power saving by the power saving stations.

Second Exemplary Embodiment

Figure 5:
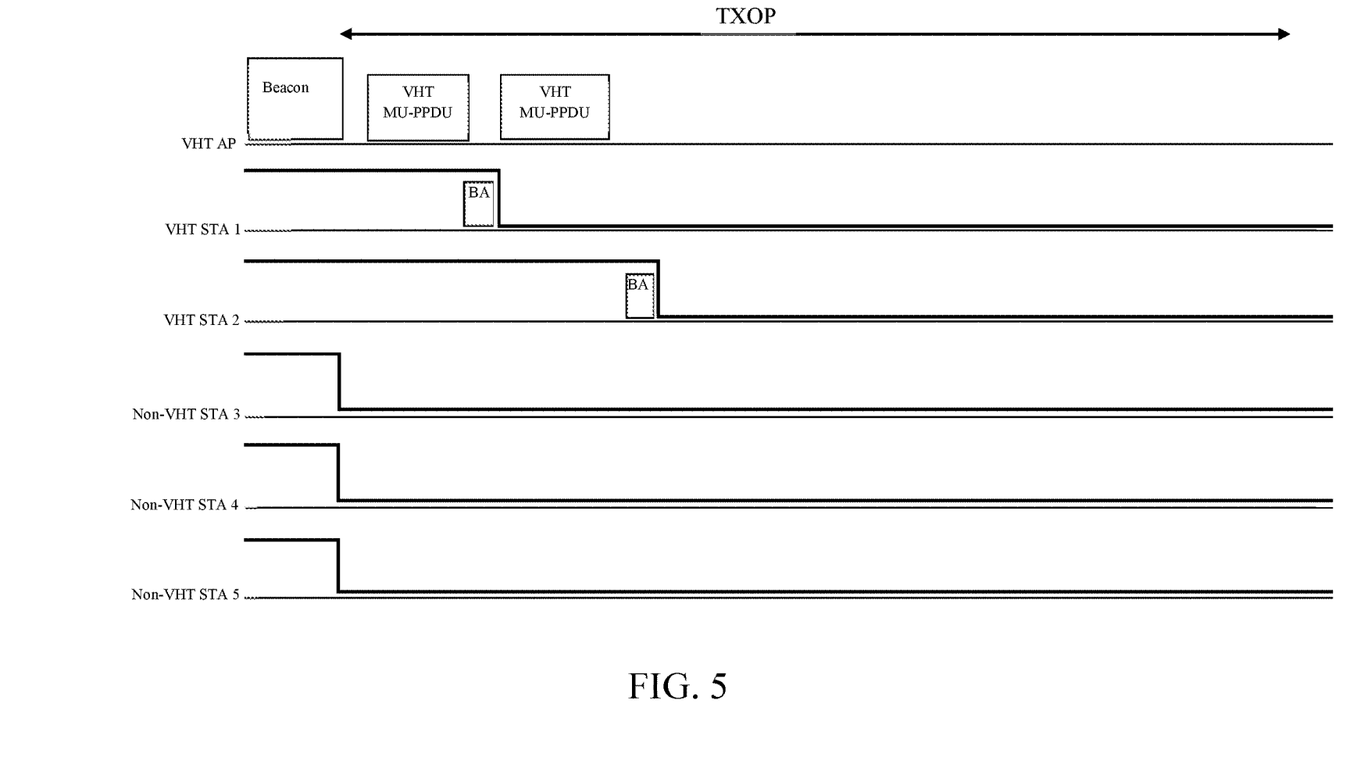
FIG. 5 illustrates a data flow sequence diagram for stations using Very High Throughput (VHT)-Transmission Opportunity (TXOP) power saving method, according to another example embodiment.

In one embodiment, a Very High Throughput (VHT)-Transmission Opportunity (TXOP) power saving method is explained referring to a data flow sequence diagram for stations using VHT-TXOP power saving method illustrated in FIG. 5. As illustrated, the VHT access point 302 communicates with power saving stations. The power saving stations comprise VHT-TXOP power saving stations STA1 320 and STA2 322 and non-VHT TXOP power saving stations STA3 324, STA4 326, and STA5 328.

In one embodiment, the VHT access point 302 may transmit a beacon to the power saving stations 320-328 connected to the VHT access point 302. The beacon may be an indication or an announcement of buffered data. The power saving stations may contend to gain access to the channel for transmission and reception of buffered data, during the new beacon period. The buffered data may comprise Wireless Local Area Network (WLAN) data frames and WLAN management frames. The VHT access point 302 may wait for some time after sending the beacon. The VHT access point 302 may wait either to receive triggers from the power saving stations or to complete ongoing transmission of data associated to a non-power saving station.

In one embodiment, the VHT access point 302 may wait when a remaining lifetime of buffered data for a VHT power saving station transmitting a trigger is of at least 10% value. A factor of 10% is chosen based on test results where an optimum power saving was achieved without affecting the data communication efficiency of the access point and the power saving stations. In another case, the remaining lifetime of the buffered data may be set to another value greater or lesser than the 10% value, to obtain better power saving results with optimum data communication efficiency.

In another embodiment, the VHT access point 302 may wait when a next Target Beacon Transmission Time (TBTT) is at least one Time Unit (TU) higher than 5% of a beacon interval. A factor of 5% is chosen based on test results where an optimum power saving was achieved without affecting the data communication efficiency of the access point and the power saving stations.

Post waiting, the VHT access point 302 may receive triggers from the power saving stations. Successive to receiving the triggers, the VHT access point 302 may determine Quality of Service (QoS) requirements of buffered data for the VHT-TXOP power saving stations STA1 320 and STA2 322 and non-VHT TXOP power saving stations STA3 324, STA4 326, and STA5 328.

In one embodiment, the QoS requirements may depend primarily on a remaining lifetime of the buffered data. The QoS requirements may depend secondarily on an amount of the buffered data and an access category of the buffered data. The access category may belong to access categories comprising voice, video, best effort, and background. In one case, a priority order of the access categories may be voice-video-best effort-background. The voice may have a highest priority and the background may have a least priority in the priority order.

In one embodiment, the VHT access point 302 may determine the QoS requirements of buffered data corresponding to the VHT TXOP power saving stations to be more than the QoS requirements of the non-VHT TXOP power saving stations. Post determining the QoS requirements for the VHT TXOP power saving stations to be more, the VHT access point 302 may send at least one of the non-VHT TXOP power saving stations into a sleep state, for a period that takes minimum of listen interval or DTIM interval. In one case, the VHT access point 302 may send the non-VHT TXOP power saving stations STA3 324, STA4 326, and STA5 328 into a sleep state. Successively, the VHT access point 302 may transmit buffered data corresponding to the VHT TXOP power saving stations STA1 320 and STA2 322.

In one embodiment, a listen interval of at least one non-VHT TXOP power saving station may be less than a Delivery Traffic Indication Map (DTIM) interval of a Basic Service Set (BSS). Further, a remaining lifetime of buffered frames associated to the at least one non-VHT TXOP power saving station may be more than two times the listen interval. During such condition, the VHT access point 302 may avoid announcement of the buffered data in Traffic Indication Map (TIM) element. Upon performing such steps, the VHT access point 302 may send the non-VHT TXOP power saving stations STA3 324, STA4 326, and STA5 328 into a sleep state, till end of a listen interval.

In one embodiment, a remaining lifetime of buffered frames for the at least one non-VHT TXOP power saving station may be greater than two times a DTIM interval of a Basic Service Set (BSS). During such condition, the VHT access point 302 may avoid announcement of the buffered data in Traffic Indication Map (TIM) element. Upon performing such steps, the VHT access point 302 may send the non-VHT TXOP power saving stations STA3 324, STA4 326, and STA5 328 into a sleep state, till end of a next Delivery Traffic Indication Map (DTIM) interval of the BSS.

Subsequent to sending the non-VHT power saving stations STA3 324, STA4 326, and STA5 328 into sleep state, the VHT access point 302 may transmit the buffered data corresponding to the VHT power saving stations STA1 320 and STA2 322. In one case, the VHT access point 302 may receive triggers from multiple VHT TXOP power saving stations belonging to a same group. The VHT access point 302 may transmit the buffered data corresponding to multiple VHT TXOP power saving stations using a MU-PPDU. In one case, the VHT access point 302 may transmit the buffered data corresponding to the VHT TXOP power saving station STA1 320 and STA2 322, using the MU-PPDU.

In one embodiment, a station grouping module 312, present in the VHT access point 302, may regroup or create new groups amongst the power saving stations. In one case, the VHT TXOP power saving stations may be grouped based on at least one of availability of the buffered data, channel estimation results, traffic patterns of the power saving stations, and locations of the power saving stations. A group membership status may be announced in a management frame by setting a "buffered group addressed frames" field in TIM element.

In one embodiment, the station grouping module 312 may group a VHT TXOP power saving station and other stations using power saving techniques different from VHT TXOP power saving, into a single group. The VHT TXOP power saving station and other stations may be grouped while QoS requirements of the other stations are more compared to remaining VHT TXOP power saving stations.

In one embodiment, the buffered data may be transmitted based on an order of the QoS requirements of buffered data corresponding to the VHT TXOP power saving stations STA1 320 and STA2 322. An order of QoS requirements may depend primarily on a remaining lifetime of the buffered data. The order of QoS requirements may depend secondarily on an amount of the buffered data and an access category of the buffered data. The access category may be at least one of voice, video, best effort, and background. In one case, a priority order of the access categories may be voice-video-best effort-background. The voice may have a highest priority and the background may have a least priority in the priority order.

Referring to the FIG. 5, an exemplary transmission scheme of the buffered data to the VHT power saving stations STA1 320 and STA2 322 is described. In one case, the VHT access point 302 may have 3 voice frames for the VHT power saving station STA1 320. Further, the VHT access point 302 may have 2 background frames for the VHT power saving station STA2 322. In current scenario, the VHT access point 302 may transmit the buffered data to the VHT power saving station STA1 320 at first and later to VHT power saving station STA2 322.

In one embodiment, the VHT access point 302 may determine a time required to serve the buffered data to the VHT TXOP power saving stations STA1 320 and STA2 322.

The time required to serve the buffered data may be determined based on fall-back rates for retransmissions and required protection mechanisms.

As explained above using the first exemplary embodiment, sending the non-VHT power saving stations into the sleep state while transmitting the buffered data to the VHT power saving stations avoids significant waiting by the non-VHT power saving stations. Thus, the above described method helps in power saving by the power saving stations.

Power consumption at a VHT station may be estimated as X mW in a receiving state. Further, the power consumption of the VHT station may be Y mW in a sleep state. A reception time of a frame may be microseconds. Total power conserved at a power saving station may be determined using below mentioned equation 1.

$$P=(X-Y)*t*10^{-3} \text{ mW} \qquad \text{Equation 1}$$

In above mentioned equation 1, X is nearly equal to (~) 40*Y during an 80 MHz operation.

Figure 6:
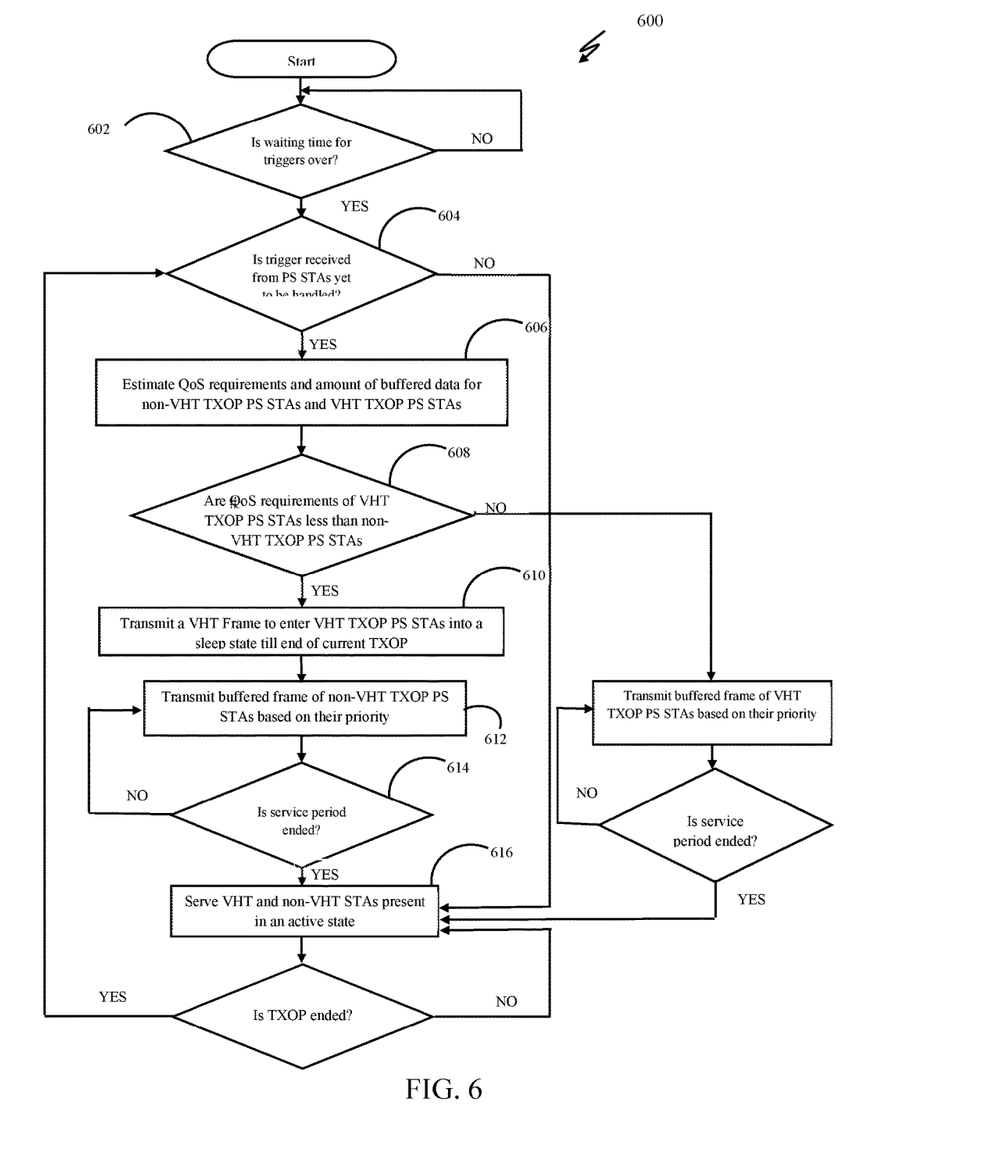
FIG. 6 illustrates a flow chart depicting a method of power saving in power saving stations connected to a Very High Throughput (VHT) access point, according to an example embodiment.

FIG. 6 illustrates a flowchart of a method of power saving in power saving stations connected to a Very High Throughput (VHT) access point, according to an embodiment. FIG. 6 comprises a flowchart 600 that is explained in conjunction with the elements disclosed in FIG. 1.

The flow chart of FIG. 6 show the method steps executed according to one or more embodiments of the present disclosure. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 6 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine. The flowchart 600 starts at the step 602 and proceeds to step 616.

At step 602, a status of waiting time for triggers may be checked. Further wait may be done while triggers from all power saving stations are not received. Step 604 may be successively executed while the waiting time gets over. In one embodiment, the waiting time may be checked by the processor 308.

At step 604, it may be checked if the triggers are received from non-Very High Throughput (VHT) Transmission Opportunity (TXOP) power saving stations. In case, no trigger is received from a non-VHT TXOP power saving station, VHT and non-VHT power saving stations present in an active state may be served at step 616. While step 606 may be executed while a trigger is received from at least one non-VHT TXOP power saving station. In one embodiment, the triggers may be checked for being received from non-VHT TXOP power saving stations, by the processor 308.

At step 606, Quality of Service (QoS) requirements and amount of buffered data may be estimated for VHT TXOP power saving stations and non-VHT TXOP power saving stations. In one embodiment, the QoS requirements and the amount of buffered data may be estimated by the processor 308.

At step 608, it may be checked if the QoS requirements of VHT TXOP power saving stations are less than the QoS requirements of non-VHT TXOP power saving stations. Step 610 may be executed while the QoS requirements of VHT TXOP power saving stations are lower than the QoS requirements of non-VHT TXOP power saving stations. In one embodiment, the QoS requirements of the VHT TXOP power saving stations and the non-VHT TXOP power saving stations may be compared by the processor 308.

At step 610, a VHT frame may be transmitted to send the VHT TXOP power saving stations into a sleep state. The VHT TXOP power saving stations may be send into a sleep state till end of a current TXOP period. In one embodiment, the VHT TXOP power saving stations may be sent into a sleep state by the processor 308.

At step 612, buffered frames of non-VHT TXOP power saving stations may be transmitted based on their priority. In one embodiment, the buffered frames of non-VHT TXOP power saving stations may be transmitted by the processor 308.

At step 614, it may be checked if the service period has ended. Transfer of the buffered frames at the step 612 may continue till the service period does not end. Further, step 616 may be executed while the service period ends. In one embodiment, the end of service period may be checked by the processor 308.

At step 616, the VHT power saving stations and non-VHT power saving stations present in an active state may be served. Post serving the VHT power saving stations and non-VHT power saving stations present in an active state, triggers may be checked for being received from non-VHT power saving stations, at step 604. In one embodiment, the end of service period may be checked by the processor 308.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/ machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e. g., a modem or network connection).

Moreover, although the present disclosure and its advantages have been described in detail, it should be understood that various changes, substitutions and alterations can be made herein without departing from the disclosure as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method of power saving in power saving stations connected to a Very High Throughput (VHT) access point, the method comprising:
    receiving, by a processor of a VHT access point, triggers from power saving stations, wherein the power saving stations are one of VHT Transmission Opportunity (TXOP) power saving stations and non-VHT TXOP power saving stations;
    determining, by the processor, Quality of service (QoS) requirements of buffered data for the power saving stations connected to the VHT access point, wherein the QoS requirements depend primarily on a remaining lifetime of the buffered data and depend secondarily on an amount of the buffered data and an access category of the buffered data, and wherein the access category belongs to access categories comprising voice, video, best effort, and background, and wherein the buffered data comprises Wireless Local Area Network (WLAN) data frames and WLAN management frames;
    based on the QoS requirements:
        sending, by a frame scheduling module, at least one VHT TXOP power saving station of the VHT TXOP power saving stations into a sleep state and transmitting buffered data corresponding to the non-VHT TXOP power saving stations while the QoS requirements of buffered data corresponding to the non-VHT TXOP power saving stations either exceeds or equal to the QoS requirements of the VHT TXOP power saving stations, wherein the buffered data is transmitted to the non-VHT TXOP power saving stations based on a decreasing order of the QoS requirements of buffered data corresponding to the non-VHT TXOP power saving stations; and
        sending, by the frame scheduling module, at least one non-VHT TXOP power saving station of the non-VHT TXOP power saving stations into a sleep state and transmitting buffered data corresponding to the VHT TXOP power saving stations while the QoS requirements of buffered data corresponding to the VHT TXOP power saving stations exceed the QoS requirement of buffered data corresponding to the non-VHT TXOP power saving stations, wherein the buffered data is transmitted to the VHT TXOP power saving stations based on a decreasing order of the QoS requirements of buffered data corresponding to the VHT TXOP power saving stations, thereby saving power in the power saving stations connected to the VHT access point.

2. The method of claim 1, wherein the trigger is one of a Power Save (PS)-Poll, Quality of Service (QoS) data, and QoS Null data, transmitted from the at least one power saving station to the VHT access point for requesting downlink delivery of the buffered data.

3. The method of claim 1, wherein a priority order of the access categories is voice-video-best effort-background with the voice having a highest priority and the background having a least priority.

4. The method of claim 1, wherein the at least one non-VHT TXOP power saving station is sent into a sleep state till end of a listen interval by avoiding announcement of the buffered data in Traffic Indication Map (TIM) element, while the listen interval of the at least one non-VHT TXOP power saving station is less than a Delivery Traffic Indication Map (DTIM) interval of a Basic Service Set (BSS) and a remaining lifetime of buffered frames associated to the at least one non-VHT TXOP power saving station is more than two times the listen interval.

5. The method of claim 1, wherein the at least one non-VHT TXOP power saving station is sent into a sleep state till end of a next Delivery Traffic Indication Map (DTIM) interval of a Basic Service Set (BSS) by avoiding announcement of the buffered data in Traffic Indication Map (TIM) element, while a remaining lifetime of buffered frames for the at least one non-VHT TXOP power saving station is more than two times a DTIM interval of a BSS.

6. The method of claim 1, further comprising transmitting the buffered data to the VHT TXOP power saving stations and the non-VHT TXOP power saving stations present in an awake state while a service period of transmitting the buffered data corresponding to a power saving station has lapsed.

7. The method of claim 1, wherein the at least one VHT TXOP power saving station is sent into the sleep state by transmitting a VHT Physical layer Protocol Data Unit (PPDU) to the at least one VHT TXOP power saving station.

8. The method of claim 7, wherein the VHT PPDU used to send the at least one VHT TXOP power saving station into the sleep state is a VHT SU-PPDU comprising a more data bit field of the VHT SU-PPDU set as zero.

9. The method of claim 1, wherein the at least one VHT TXOP power saving station is sent into the sleep state by sending a VHT SU-PPDU with QoS-Null data frame comprising a more data bit field set as zero, using a no-acknowledgement (no-ACK) policy, and a PARTIAL_AID belonging to the VHT SU-PPDU is set as similar to the PARTIAL_AID of the station receiving QoS NULL data.

10. The method of claim 7, wherein the at least one VHT TXOP power saving station is sent into the sleep state by sending a VHT MU-PPDU comprising a more data bit field of the at least one VHT MU-PPDU set as zero.

11. The method of claim 7, wherein the at least one VHT TXOP power saving station is sent into the sleep state by sending a VHT MU-PPDU with QoS-Null data frame comprising a more data bit field set as zero, using a no-acknowledgement (no-ACK) policy, a Group ID (GID) belonging to the VHT MU-PPDU set similar to a GID of a group comprising the at least one VHT TXOP power saving station, and a Number of Spatial Streams ($N_{STS}$) of VHT TXOP power saving stations present in the group other than the at least one VHT TXOP power saving station set as zero.

12. The method of claim 1, further comprising sending the VHT TXOP power saving stations into the sleep state by transmitting a VHT MU-PPDU with QoS Null data and a GROUP ID not matching with any group in a BSS.

13. The method of claim 1, further comprising waiting by the VHT access point, after a beacon is sent by the VHT access point, either to receive the triggers from the power saving stations or to complete ongoing transmission of data associated to a non-power saving station.

14. The method of claim 13, wherein the VHT access point waits when a remaining lifetime of the buffered data for a VHT power saving station transmitting a trigger is of at least 10% value.

15. The method of claim 13, wherein the VHT access point waits when a next Target Beacon Transmission Time (TBTT) is at least one Time Unit (TU) higher than 5% of a beacon interval.

16. The method of claim 1, further comprising grouping the power saving stations by a station grouping module, wherein the power saving stations are grouped based on at least one of availability of the buffered data, channel estimation results, traffic patterns of the power saving stations, and locations of the power saving stations.

17. The method of claim 16, further comprising announcing a group membership status in a management frame by setting a buffered group addressed frames field in TIM element.

18. The method of claim 1, further comprising transmitting the buffered data corresponding to multiple VHT TXOP power saving stations using a MU-PPDU while triggers are received from the multiple VHT TXOP power saving stations belonging to a same group.

19. The method of claim 1, further comprising grouping the at least one VHT TXOP power saving station and other stations using power saving techniques different from VHT TXOP power saving, into a single group while QoS requirements of the other stations are more compared to remaining VHT TXOP power saving stations.

20. The method of claim 1, further comprising determining a time required to serve the buffered data to the at least one non-VHT TXOP power saving stations and the VHT TXOP power saving stations, wherein the time required to serve the buffered data is determined based on fall-back rates for retransmissions and required protection mechanisms.

21. A Very High Throughput (VHT) access point for power saving in power saving stations connected to the VHT access point, the VHT access point comprising:
   a processor to:
      receive triggers from power saving stations, wherein the power saving stations are one of VHT Transmission Opportunity (TXOP) power saving stations and non-VHT TXOP power saving stations;
      determine Quality of service (QoS) requirements of buffered data for the power saving stations connected to the VHT access point, wherein the QoS requirements depend primarily on a remaining lifetime of the buffered data and depend secondarily on an amount of the buffered data and an access category of the buffered data, and wherein the access category belongs to access categories comprising voice, video, best effort, and background, and wherein the buffered data comprises Wireless Local Area Network (WLAN) data frames and WLAN management frames;
      based on the QoS requirements, a frame scheduling module of the processor to:
         send at least one VHT TXOP power saving station of the VHT TXOP power saving stations into a sleep state and transmitting buffered data corresponding to the non-VHT TXOP power saving stations while the QoS requirements of buffered data corresponding to the non-VHT TXOP power saving stations either exceeds or equal to the QoS requirements of the VHT TXOP power saving stations, wherein the buffered data is transmitted to the non-VHT TXOP power saving stations based on a decreasing order of the QoS requirements of buffered data corresponding to the non-VHT TXOP power saving stations; and
         send at least one non-VHT TXOP power saving station of the non-VHT TXOP power saving stations into a sleep state and transmitting buffered data corresponding to the VHT TXOP power saving stations while the QoS requirements of buffered data corresponding to the VHT TXOP power saving stations exceed the QoS requirement of buffered data corresponding to the non-VHT TXOP power saving stations, wherein the buffered data is transmitted to the VHT TXOP power saving stations based on a decreasing order of the QoS requirements of buffered data corresponding to the VHT TXOP power saving stations, thereby saving power in the power saving stations connected to the VHT access point.

22. A non-transient computer-readable medium comprising instructions for causing a programmable processor to:
   receive triggers from power saving stations, wherein the power saving stations are one of VHT Transmission Opportunity (TXOP) power saving stations and non-VHT TXOP power saving stations;
   determine Quality of service (QoS) requirements of buffered data for the power saving stations connected to the VHT access point, wherein the QoS requirements depend primarily on a remaining lifetime of the buffered data and depend secondarily on an amount of the buffered data and an access category of the buffered data, and wherein the access category belongs to access categories comprising voice, video, best effort, and background, and wherein the buffered data comprises Wireless Local Area Network (WLAN) data frames and WLAN management frames;
   based on the QoS requirements:
      send at least one VHT TXOP power saving station of the VHT TXOP power saving stations into a sleep state and transmitting buffered data corresponding to the non-VHT TXOP power saving stations while the QoS requirements of buffered data corresponding to the non-VHT TXOP power saving stations either exceeds or equal to the QoS requirements of the VHT TXOP power saving stations, wherein the buffered data is transmitted to the non-VHT TXOP power saving stations based on a decreasing order of the QoS requirements of buffered data corresponding to the non-VHT TXOP power saving stations; and
      send at least one non-VHT TXOP power saving station of the non-VHT TXOP power saving stations into a sleep state and transmitting buffered data corresponding to the VHT TXOP power saving stations while the QoS requirements of buffered data corresponding to the VHT TXOP power saving stations exceed the QoS requirement of buffered data corresponding to the non-VHT TXOP power saving stations, wherein the buffered data is transmitted to the VHT TXOP power saving stations based on a decreasing order of the QoS requirements of buffered data corresponding to the VHT TXOP power saving stations, thereby saving power in the power saving stations connected to the VHT access point.

\* \* \* \* \*